(12) United States Patent
Neale

(10) Patent No.: US 7,445,289 B2
(45) Date of Patent: Nov. 4, 2008

(54) TILTING HEAD RESTRAINT WITH A USE POSITION AND A STOWED POSITION

(75) Inventor: Colin G. Neale, Northville, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/564,487

(22) PCT Filed: Jul. 28, 2004

(86) PCT No.: PCT/US2004/025720

§ 371 (c)(1),
(2), (4) Date: May 18, 2006

(87) PCT Pub. No.: WO2005/012034

PCT Pub. Date: Feb. 10, 2005

(65) Prior Publication Data

US 2006/0226690 A1    Oct. 12, 2006

(51) Int. Cl.
B60N 2/48 (2006.01)
(52) U.S. Cl. .................................................. 297/408
(58) Field of Classification Search .................. 297/408, 297/403
See application file for complete search history.

(56) References Cited

U.S. PATENT DOCUMENTS

| | | | |
|---|---|---|---|
| 3,174,799 A * | 3/1965 | Haltenberger | ............... 297/403 |
| 3,186,763 A | 6/1965 | Ferrara | |
| 3,304,120 A * | 2/1967 | Cramer | ....................... 297/403 |
| 3,547,486 A | 12/1970 | Herzer et al. | |
| 3,586,366 A | 6/1971 | Patrick | |
| 3,655,241 A | 4/1972 | Herzer et al. | |
| 3,695,700 A | 10/1972 | Flach | |
| 4,113,310 A | 9/1978 | Kapanka | |
| 4,266,760 A | 5/1981 | Matsui et al. | |
| 4,600,240 A | 7/1986 | Suman et al. | |
| 4,762,367 A * | 8/1988 | Denton | ....................... 297/409 |
| 4,943,182 A * | 7/1990 | Hoblingre | ................... 403/349 |
| 5,590,933 A | 1/1997 | Andersson | |
| 5,738,411 A | 4/1998 | Sutton et al. | |

(Continued)

FOREIGN PATENT DOCUMENTS

DE    44 21 825    1/1996

(Continued)

Primary Examiner—Peter R. Brown
(74) Attorney, Agent, or Firm—Clark Hill PLC

(57) ABSTRACT

A head and restraint assembly for a motor vehicle seat having a seat back includes a support member that is removably securable to the seat back. A body portion including a foam cushion is disposed adjacent the support member. A pivot tube is fixedly secured to the support member. The pivot tube defines a slot cut through the pivot tube. A spring is fixedly secured to the pivot tube and extends through a portion of the pivot tube. The head restraint assembly also includes a pivot rod that is disposed within the pivot tube. The pivot rod includes a guide pin that extends out of the pivot rod and is received by the slot. The pivot rod is fixedly secured to the body portion such that rotation of the pivot rod with respect to the pivot tube pivots the body portion with respect to the support member to move the body portion between a use and a tilted position.

10 Claims, 2 Drawing Sheets

U.S. PATENT DOCUMENTS

| | | |
|---|---|---|
| 6,000,760 A | 12/1999 | Chung |
| 6,074,011 A | 6/2000 | Ptak et al. |
| 6,129,421 A | 10/2000 | Gilson et al. |
| 2002/0079732 A1 | 6/2002 | Saberan et al. |
| 2003/0178881 A1 | 9/2003 | Holdampf et al. |

FOREIGN PATENT DOCUMENTS

| | | |
|---|---|---|
| FR | 1 562 595 | 4/1969 |
| GB | 1 537 551 | 12/1978 |

\* cited by examiner

TILTING HEAD RESTRAINT WITH A USE POSITION AND A STOWED POSITION

BACKGROUND OF THE INVENTION

1. Field of the Invention

The invention relates to a head restraint assembly for a motor vehicle seat. More particularly, the invention relates to a head restraint assembly including a body portion that tilts forward relative to the motor vehicle seat.

2. Description of Related Art

A seat for a motor vehicle includes a seat cushion and a seat back pivotally secured thereto for movement between an upright use position and a stowed position. A head restraint extends vertically above a seat back to restrict movement of an occupant's head during high acceleration or deceleration rates, particularly during a rear impact collision. The head restraint is also designed to provide comfort to the occupant.

At the same time, the location of the head restraint above the seat back presents various challenges. First, when used in conjunction with a back seat or a back row of seats, the head restraint obstructs the driver's view to the rear thereof. Second, the head restraint increases the height of the seat. This increased height is a problem when designing stowable seats. More specifically, the head restraint may prohibit full pivoting of the seat back into a stowed position, thereby preventing an optimized load floor.

To address these problems, various retractable head restraint assemblies have been developed that move between an upright position and a forwardly-rotated stowed position. These retractable head restraint assemblies are well known to those skilled in the art.

SUMMARY OF THE INVENTION

A head rest or restraint assembly for a motor vehicle seat having a seat back includes a support member that is removably securable to the seat back. A body portion including a foam cushion is disposed adjacent the support member. A pivot tube is fixedly secured to the support member. The pivot tube defines a slot cut through the pivot tube. A torsion spring is fixedly secured to the pivot tube and extends through a portion of the pivot tube. The head restraint assembly also includes a pivot rod that is disposed within the pivot tube. The pivot rod includes a guide pin that extends out of the pivot rod and received by the slot. The pivot rod is fixedly secured to the body portion such that rotation of the pivot rod with respect to the pivot tube pivots the body portion with respect to the support member to move the body portion between a use position and a tilted position.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
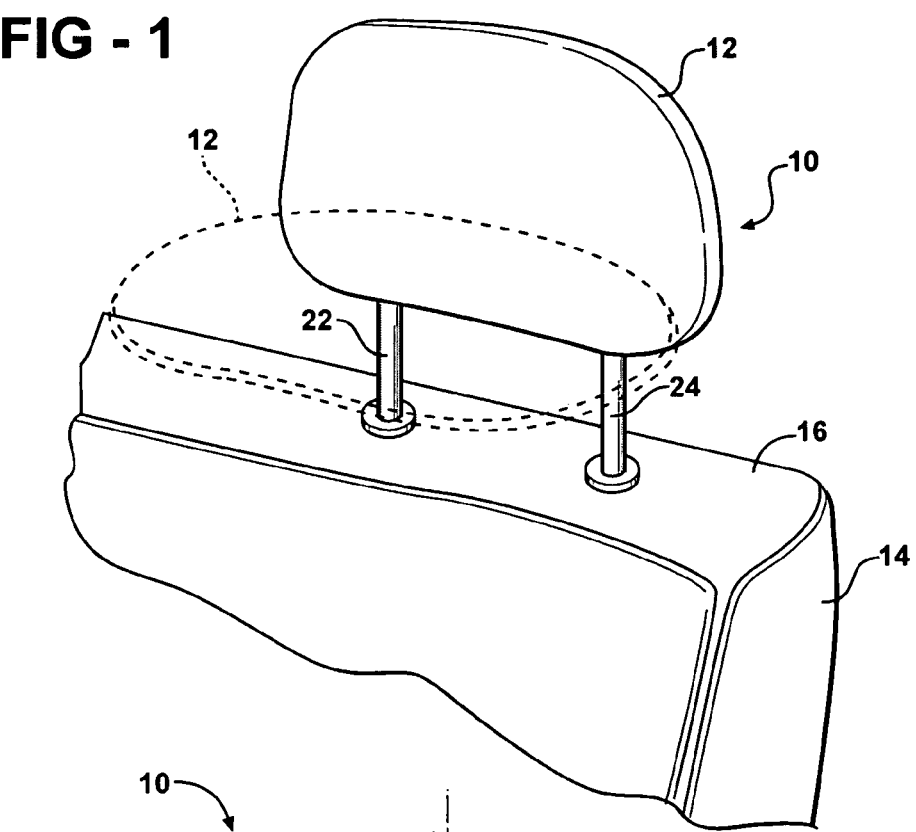
FIG. 1 is a fragmentary, front perspective view of a head restraint assembly according to the invention in upright and tilted positions secured to a seat back.

Referring to FIG. 1, a head restraint assembly, generally indicated at 10, includes a body portion 12 for restricting head movement of an occupant during a rapid motor vehicle acceleration or deceleration. The body portion 12, which is coupled to a seat back 14 of a rear seat 16, is movable between an upright position and a tilted position (shown in dashed lines). When the body portion 12 is in the tilted position, a driver is provided with an unobstructed view out the rear of a motor vehicle (not shown).

By pivoting the body portion 12 into the tilted position, the height of the rear seat 16 is reduced. As a result, there is greater clearance between the seat back 14 and a front seat (not shown) when the seat back 14 is fully pivoted into a forward dump position, thereby optimizing the functionality of the load floor and increasing storage space within the motor vehicle. It will be appreciated that although the head restraint assembly 10 is described with respect to a rear seat, the head restraint assembly 10 may be coupled to any seat within the motor vehicle.

Figure 2:
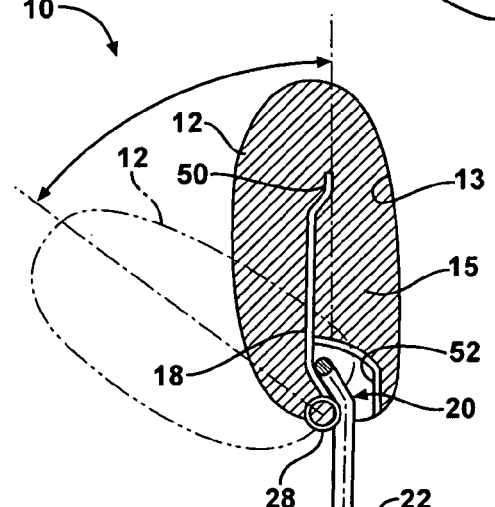
FIG. 2 is a cross-sectional side view of the head restraint assembly.
Figure 2:
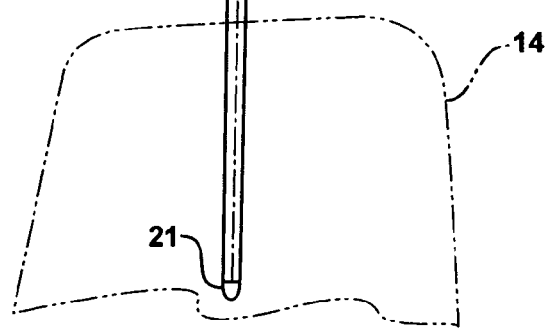
Figure 3:
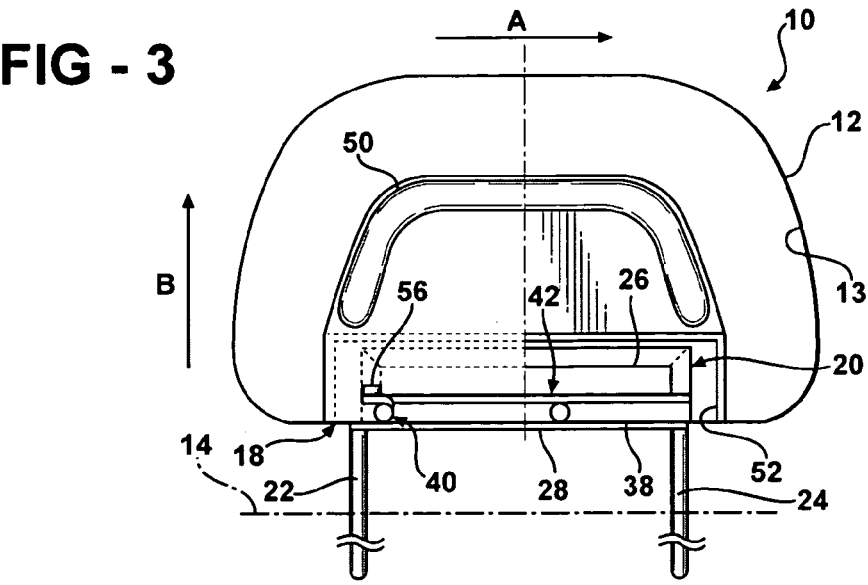
FIG. 3 is a partially cut away front view of the head restraint assembly.

Referring to FIGS. 2 and 3, the body portion 12 includes an interior area 13. The interior area 13 is filled with a foam material 15 to provide a cushion preventing a seat occupant from feeling any portion of a frame, generally shown at 20, of the head restraint assembly 10. A tilting mechanism, generally indicated at 18, is housed within the interior area 13 of the body portion 12. The tilting mechanism 18 pivots relative to the frame or support member 20, to move the body portion 12 between its upright and tilted positions. The support member 20 extends from the body portion 12 downwardly into the interior of the seat back 14. The support member 20 is adjustable vertically with respect to the seat back 14 allowing the body portion 12 to be adjusted to the height of the seat occupant.

Figure 4:
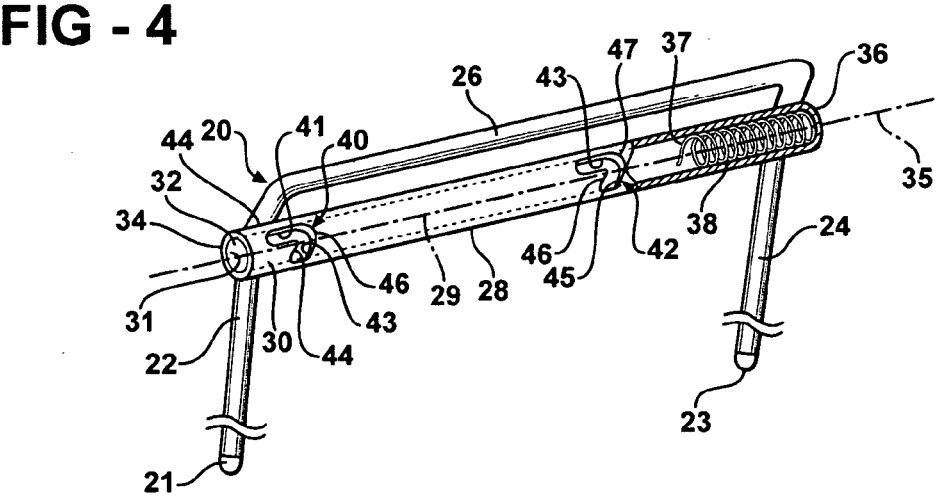
FIG. 4 is an isolated front perspective view of a pivoting member of the head restraint assembly.

Referring to FIG. 4, the support member 20 is generally U-shaped and includes vertically extending posts 22, 24 and a cross bar 26 extending therebetween. The vertically extending posts 22, 24 extend down to distal ends 21, 23. This constitutes substantially the frame of the body portion 12. The support member 20 may include an additional framing or reinforcement member 50, discussed subsequently. The vertically extending posts 22, 24 allow for vertical adjustment of the body portion 12 relative to the seat back 14. It will be appreciated that although two posts 22, 24 are shown in the Figures, the number of posts may vary depending upon the design of the head restraint assembly 10.

The tilting mechanism 18 includes an elongated pivot tube 28 that is fixedly secured to the support member 20 and extends between the posts 22, 24 and fixedly secured thereto. The pivot tube 28 defines a longitudinal axis 29 and is generally parallel to the cross bar 26. The pivot tube 28 includes an outer tube wall 30, an inner tube wall 31, and defines a hollow 32. The pivot tube 28 extends between opposing first 34 and second 36 tube ends.

Referring to FIG. 4, the support member 20 is generally U-shaped and includes vertically extending posts 22, 24 and a cross bar 26 extending therebetween. The vertically extending posts 22, 24 extend down to distal ends 21, 23. This constitutes substantially the frame of the support member 20. The vertically extending posts 22, 24 allow for vertical adjustment of the body portion 12 relative to the seat back 14. It will be appreciated that although two posts 22, 24 are shown in the FIGS., the number of posts may vary depending upon the design of the head restraint assembly 10.

The pivot tube 28 defines spaced apart, J-shaped slots, generally indicated at 40, 42. The J-shaped slots 40, 42 are positioned at a distance from each other as well as the second end 37 of the torsion spring 38. More specifically, none of the J-shaped slots 40, 42 nor the torsion spring 38 overlap at any time during the operation of the head restraint assembly 10. The slots 40, 42 include primary segments 41, 43 and secondary segments 44, 45. The respective segment pairs 41, 44 and 43, 45 extend parallel to each other (and the torsion spring 38) and are joined together by cross slot segments 46, 47 to form the slots 40, 42 into the J-shapes.

Figure 5:
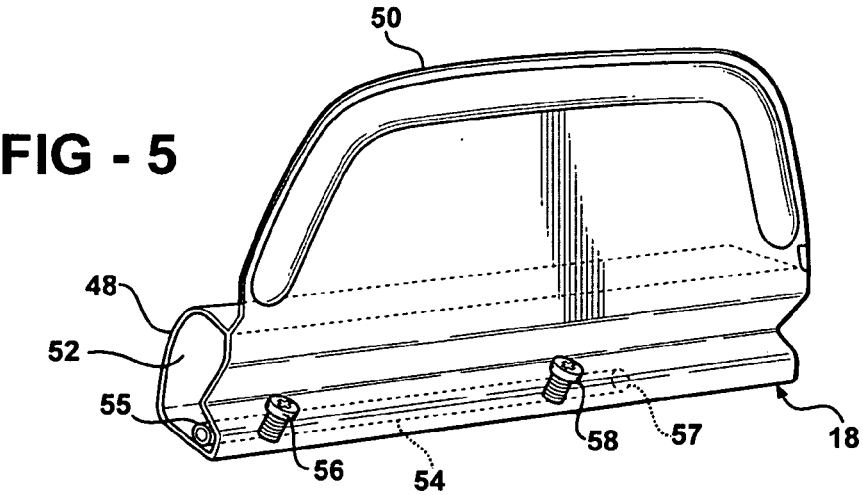
FIG. 5 is an isolated front perspective view of a support member of the head restraint assembly.

Referring to FIG. 5, the tilting member 18 includes a lower bracket 48 and a generally U-shaped reinforcement member 50 extending thereabove. The reinforcement member 50 is a part of the frame that allows the foam 15 to be secured thereto. In addition, it provides a rigid structure against which lateral forces may be applied without distorting the shape of the head restraint assembly 10.

The lower bracket 48 includes an internal cavity 52. The tilting member 18 includes an integrally formed pivot rod 54 within the internal cavity 52. The pivot rod 54 extends between a free end 55 and a spring end 57. Two guide pins 56, 58 extend radially out from the pivot rod 54. The two guide pins 56, 58 are spaced apart from each other. The pivot rod 54 extends through the pivot tube 28 and abuts against the second end 37 of the torsion spring 38. The two guide pins 56, 58 extend through the two J-shaped slots 40, 42, respectively, and may move relative thereto.

In operation, starting with the body portion 12 in the use position and the guide pins 56, 58 in the primary segments 41, 43, a lateral force in the direction of arrow A in FIG. 3 is applied to the body portion 12. This force causes the pivot rod 54 to move laterally inside the pivot tube 38 and compress the torsion spring 38. The guide pins 56, 58 move along the primary segments 41, 43 toward the cross slot segments 46, 47. By changing the direction of the force being applied to the body portion 12, the guide pins 56, 58 move along the cross slot segments 46, 47 toward the secondary segments 44, 45. The movement of the guide pins 56, 58 within the cross slot segments 46, 47 causes the pivot rod 54 and the body portion 12 to pivot downwardly relative to the support member 20. Thus, the body portion 12, which is fixedly secured to the pivot rod 54 by the guide pins 56, 58, tilts forward into its tilted position.

Once the body portion 12 reaches the tilted position, the guide pins 56, 58 are aligned to be received by the secondary segments 44; 45. The torsion spring 38 then forces the guide pins 56, 58 into the secondary segments 44, 45 retaining the body portion 12 in its tilted position.

To return the body portion 12 to the upright position, a second force in the direction of arrow A is applied against the body portion 12 to force the guide pins 56, 58 back through the secondary segments 44, 45 toward the cross slot segments 46, 47. An upward force in the direction of arrow B in FIG. 3 is applied to the body portion 12 to move the guide pins 56, 58 through the cross slot segments 46, 47. This upward force causes the body portion 12 to pivot upwardly. Once the guide pins 56, 58 reach the primary segments 41, 43, the torsion spring 38 will decompress, thereby urging the guide pins 56, 58 into the primary segments 41, 43 and away from the cross slot segments 46, 47, which will retain the body portion 12 in the upright position.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A head restraint assembly for a motor vehicle seat having a seat back, said head restraint assembly comprising:
    a support member removably securable to the seat back;
    a body portion including a foam cushion operatively coupled to said support member for pivotal movement relative to said support member between a generally upright use position and a tilted position;
    a pivot tube fixedly secured to said support member, said pivot tube defining a pivot tube slot cut through said pivot tube;
    a helical spring fixedly secured to said pivot tube and extending through a portion of said pivot tube; and
    a pivot rod disposed within said pivot tube, said pivot rod including a guide pin extending out of said pivot rod and received by said pivot tube slot, said pivot rod fixedly secured to said body portion such that rotation of said pivot rod with respect to said pivot tube pivots said body portion with respect to said support member to move said body portion between said use position and said tilted position;
    wherein said pivot tube slot includes a primary segment and a secondary segment parallel to and spaced apart from said primary segment for providing lateral movement of said body portion relative to said support member to retain said body portion in each of said use and tilted positions.

2. A head restraint as set forth in claim 1 wherein said pivot tube slot further includes a cross slot segment perpendicular to said primary and secondary segments, said cross slot segment defining a segment of said pivot slot connecting said primary segment to said secondary segment for guiding said guide pins therebetween and providing said pivotal movement of said body portion relative to said support member.

3. A head restraint assembly as set forth in claim 2 wherein said primary, secondary and cross slot segments form said pivot tube slot in a J-shape.

4. A head restraint assembly as set forth in claim 3 wherein said pivot tube includes a second pivot tube slot cut therethrough and spaced apart from said pivot tube slot.

5. A head restraint assembly as set forth in claim 4 wherein said second pivot tube slot cuts through said pivot tube in a configuration identical to said J-shape of said pivot tube slot.

6. A head restraint assembly as set forth in claim 5 wherein said pivot rod includes a second guide pin positioned to extend through said second pivot tube slot.

7. A head restraint assembly as set forth in claim 6 wherein said pivot rod includes a spring end abutting said helical spring.

8. A head restraint assembly as set forth in claim 7 wherein said body portion includes an internal cavity to allow said body portion to pivot with respect to said support member.

9. A head restraint assembly as set forth in claim 8 wherein said support member includes a vertical post having a distal end received by the seat back.

10. A head restraint assembly as set forth in claim 9 wherein said support member further includes a cross bar extending through a portion of said body portion.

* * * * *